(12) United States Patent
Vikström et al.

(10) Patent No.: US 7,806,423 B2
(45) Date of Patent: Oct. 5, 2010

(54) FIFTH WHEEL ASSEMBLY FOR COUPLING A TRAILER TO A TRUCK TRACTOR AND A METHOD FOR OPERATING SAID ASSEMBLY

(75) Inventors: Tobias Vikström, Lerum (SE); Benny Liljeblad, Lerum (SE)

(73) Assignee: Volvo Lastvagna AB, Gothenburg (SE)

( * ) Notice: Subject to any disclaimer, the term of this patent is extended or adjusted under 35 U.S.C. 154(b) by 104 days.

(21) Appl. No.: 12/089,188

(22) PCT Filed: Oct. 24, 2006

(86) PCT No.: PCT/SE2006/001199

§ 371 (c)(1),
(2), (4) Date: Apr. 3, 2008

(87) PCT Pub. No.: WO2007/050019

PCT Pub. Date: May 3, 2007

(65) Prior Publication Data

US 2008/0265544 A1    Oct. 30, 2008

(30) Foreign Application Priority Data

Oct. 27, 2005   (SE) .................................... 0502402

(51) Int. Cl.
*B62D 53/08* (2006.01)
(52) U.S. Cl. ................. 280/405.1; 280/438.1; 280/407; 280/407.1; 280/441; 280/441.1
(58) Field of Classification Search .............. 280/405.1, 280/438.1, 407, 407.1, 441, 441.1
See application file for complete search history.

(56) References Cited

U.S. PATENT DOCUMENTS

| 4,429,892 | A | 2/1984 | Frampton et al. | |
|---|---|---|---|---|
| 4,505,344 | A | 3/1985 | Hobbs et al. | |
| 4,649,369 | A | 3/1987 | Walker et al. | |
| 5,863,057 | A | 1/1999 | Wessels | |
| 6,203,045 | B1 * | 3/2001 | Kyrtsos et al. | 280/405.1 |
| 6,921,100 | B2 * | 7/2005 | Mantini et al. | 280/407 |

(Continued)

FOREIGN PATENT DOCUMENTS

DE    3208315 A1    9/1983

(Continued)

OTHER PUBLICATIONS

International Search Report from corresponding International Application PCT/SE2006/001199.

(Continued)

*Primary Examiner*—Lesley Morris
*Assistant Examiner*—Marlon A Arce
(74) *Attorney, Agent, or Firm*—WRB-IP LLP

(57) ABSTRACT

A fifth wheel assembly for coupling a trailer to a truck tractor is provided and includes a fifth wheel and a supporting structure for supporting the fifth wheel on the rear part of the tractor truck. The supporting structure includes a sliding arrangement enabling the fifth wheel to be repositioned between different positions. A number of sensors are positioned on the supporting structure and on the fifth wheel and are included in a control system for predetermined information and control of operating conditions.

2 Claims, 5 Drawing Sheets

U.S. PATENT DOCUMENTS

2005/0121921 A1* 6/2005 Alguera et al. .............. 292/201
2008/0036173 A1* 2/2008 Alguera ...................... 280/407
2009/0160214 A1* 6/2009 Alguera .................. 296/180.3

FOREIGN PATENT DOCUMENTS

| DE | 10 2004 045 662.3 | * | 10/2004 |
|----|-------------------|---|---------|
| EP | 1295783 A2 | | 3/2003 |
| EP | 1717134 A | | 11/2006 |
| GB | 2082131 A | | 3/1982 |
| WO | 2006046903 A1 | | 5/2006 |

OTHER PUBLICATIONS

International Preliminary Report on Patentability for corresponding International Application PCT/SE2006/001199.

Supplementary European Search Report for corresponding European App. 06 79 9796.

* cited by examiner

FIFTH WHEEL ASSEMBLY FOR COUPLING A TRAILER TO A TRUCK TRACTOR AND A METHOD FOR OPERATING SAID ASSEMBLY

BACKGROUND AND SUMMARY

The present invention relates to a fifth wheel assembly.

The present invention further relates to a method for operating said assembly.

Different fifth wheel assemblies are previous known disclosing slide mountings enabling repositioning the fifth wheel for different driving conditions, see for example EP0052792A2.

It is desirable to optimize the conditions not only for the driving purpose but also for the coupling situations.

According to an aspect of the present invention, a fifth wheel assembly for coupling a trailer to a truck tractor is provided, said assembly comprising a fifth wheel and a supporting structure for supporting the fifth wheel on a rear part of the tractor truck, said supporting structure including a sliding arrangement enabling the fifth wheel to be repositioned between different positions, wherein the fifth wheel is repositionable between one or more forward, normal operating positions and one or more rear coupling/disconnecting positions, and said assembly includes a plurality of sensors positioned on the supporting structure and on the fifth wheel, said sensors being included in a control system for predetermined information and/or control of operating conditions, and said control system is operable to control said operating conditions in respect of at least one of: height, axle load, traveled distance, maximum speed.

According to an aspect of the present invention, a method of operating a fifth wheel assembly for coupling a trailer to a truck tractor is provided, said assembly comprising a fifth wheel and a supporting structure for supporting the fifth wheel on a rear part of the truck tractor, said supporting structure including a sliding arrangement enabling the fifth wheel to be repositioned between different positions. The method includes steps of (a) repositioning the fifth wheel between at least positions and at least one rear coupling/disconnecting positions, and (b) sensing said positions by means of a control system for predetermined information and/or control of operating conditions, said control system being operable to control said operating conditions in respect of at least one of: height, axle load, traveled distance, maximum speed.

BRIEF DESCRIPTION OF DRAWINGS

The present invention will be further described below with reference to the accompanying drawings in which.

DETAILED DESCRIPTION

Figure 1:
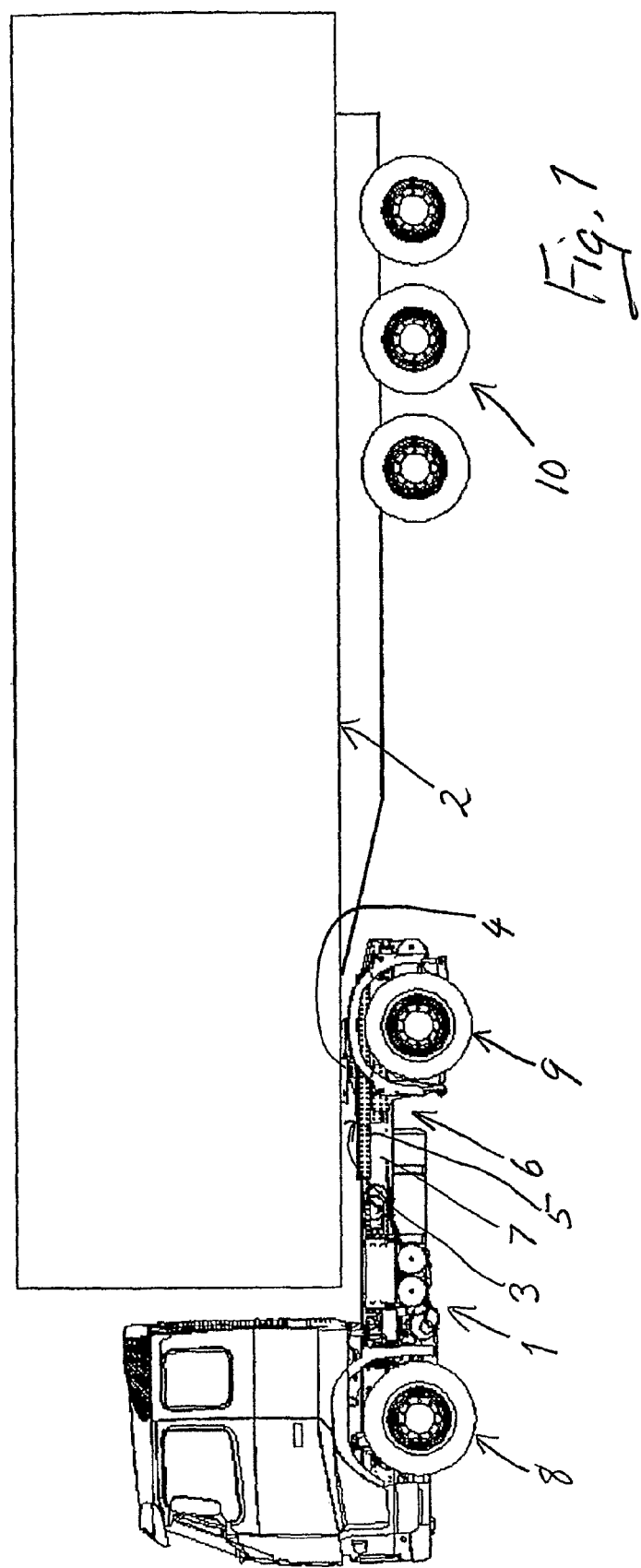
FIG. 1 is a side view of a truck tractor provided with the fifth wheel assembly according to the present invention and having a trailer coupled thereto.
Figure 2:
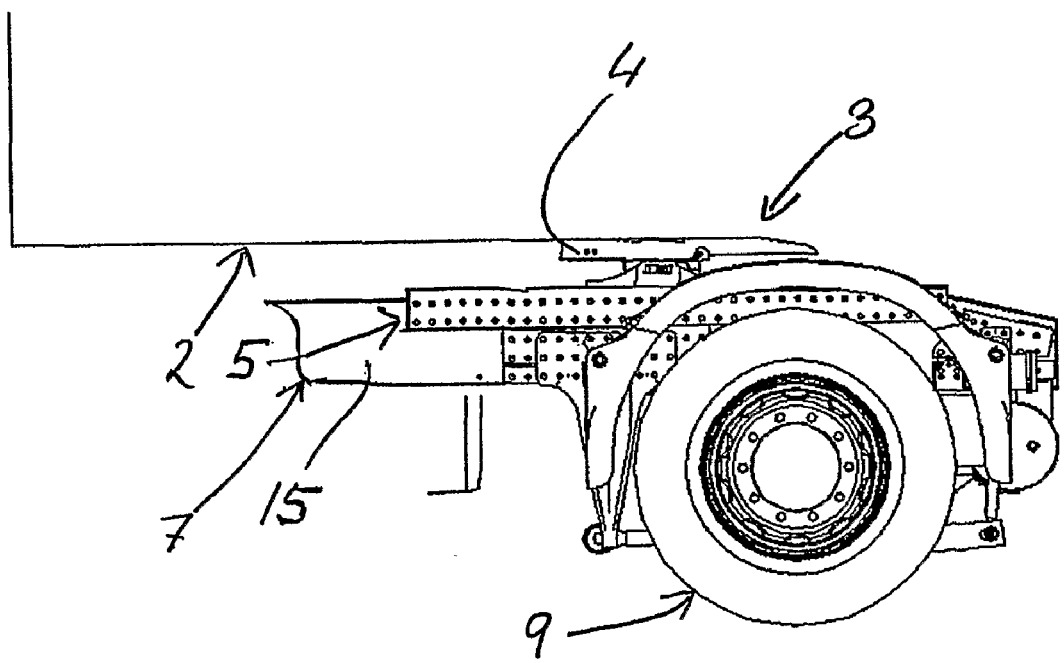
FIG. 2 is a partial view of a rear part of the truck tractor and a front part of a trailer.

In FIG. 1 a truck tractor 1 is shown having a trailer 2 coupled thereto. For this purpose the truck tractor has a fifth wheel assembly 3, forming the tractor part of the coupling cooperating with a corresponding coupling part of the trailer, including a king pin (not shown) projecting downwards from the underside of the forward end of the trailer.

Figure 3:
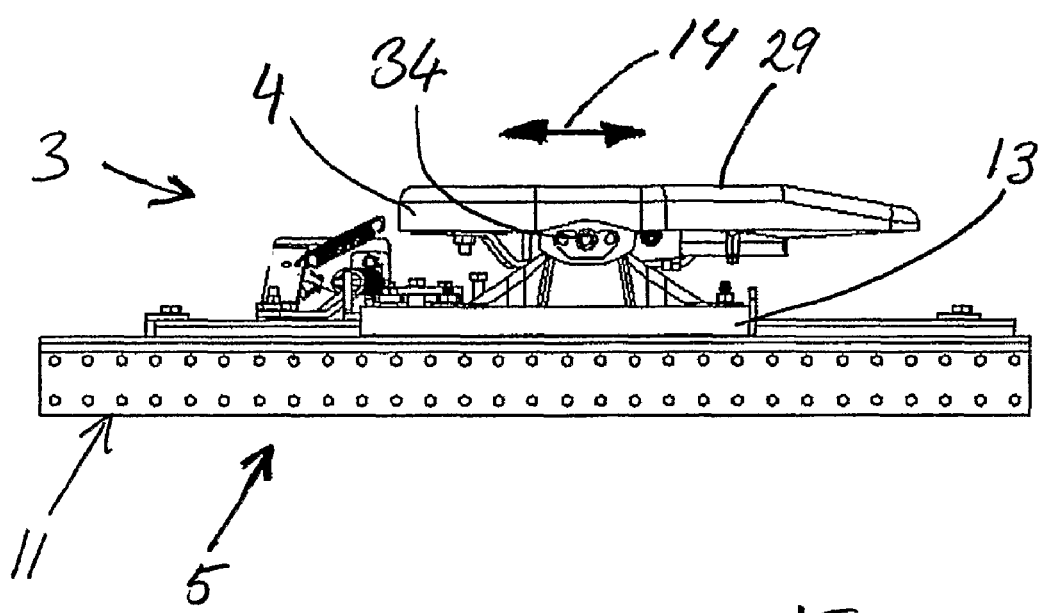
FIG. 3 is a side view of the fifth wheel assembly according to the present invention, shown separately.
Figure 4:
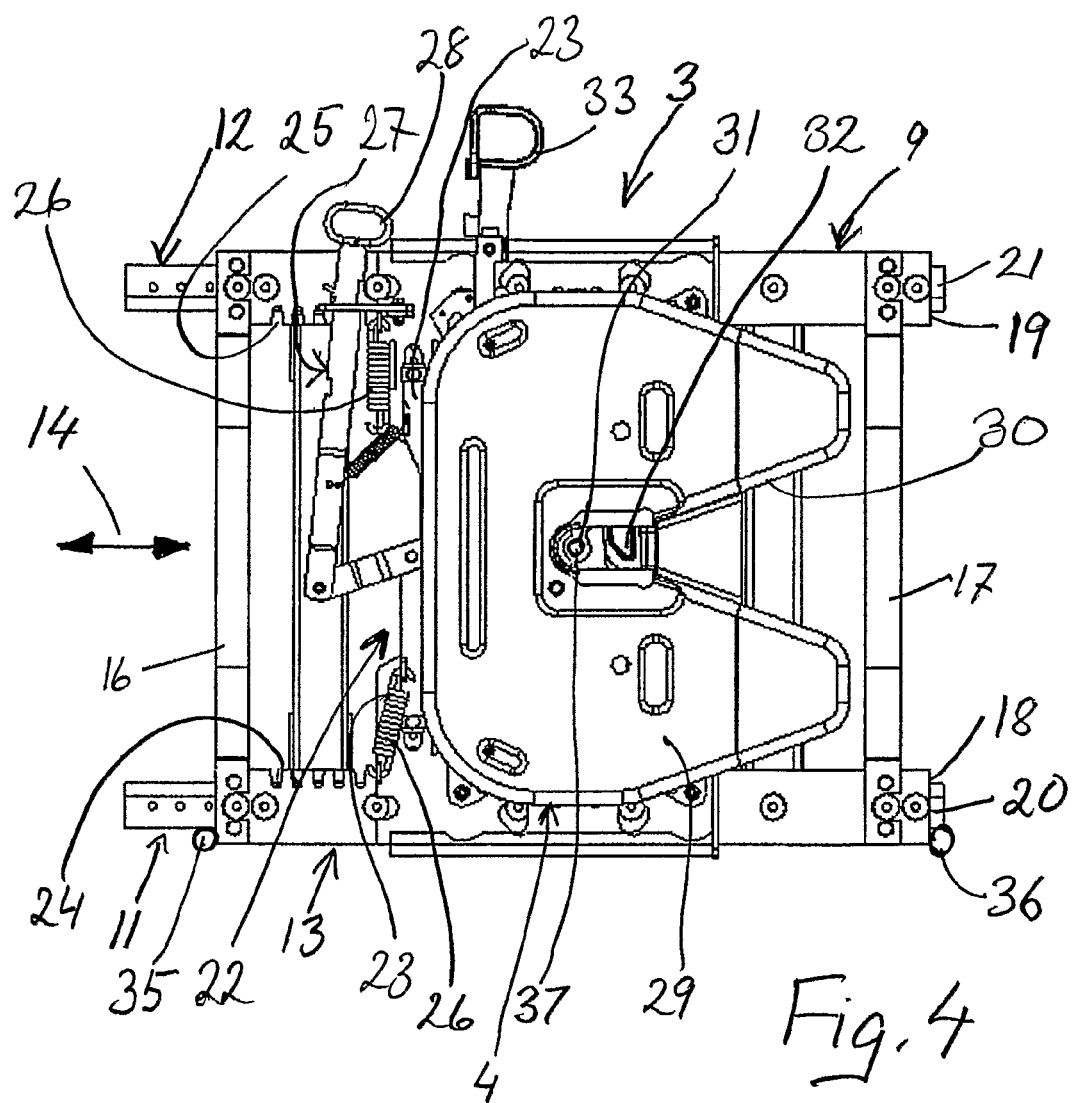
FIG. 4 is a top view of the device according to the invention, shown separately.

From the drawings it is apparent that the fifth wheel assembly 3 mainly comprises a fifth wheel 4 and a supporting structure 5 for supporting the fifth wheel on the rear part 6 of the main frame 7 of the tractor truck having a front and a rear truck wheel assembly 8, 9. The rear end of the trailer 2 is supported by a trailer wheel assembly 10. The supporting structure 5 includes a sliding arrangement comprising guide rails 11, 12 and a carriage or slide 13 which is best apparent from FIGS. 3 and 4. Said carriage 13 supports the fifth wheel 4 and is movable along the rails along a path extending in the longitudinal direction of the truck illustrated by means of the double arrow 14. Said guide rails 11, 12 are two members extending in mutual parallel relationship and in parallel with the main beams 15 of the main frame 7 and form an integral rigid unit by means of a number of cross members, such as bars 16, 17.

The carriage 9 has guide means with guide surfaces 18, 19 for sliding cooperation with corresponding guide means with guide surfaces 20, 21 on the rails 11, 12 to perform the controlled motion along the longitudinal path. A locking mechanism 22 forms part of the assembly and provides for locking and releasing the fifth wheel 4 in a determined position along the path. The locking mechanism 22 is in the example as shown two latches 23 situated on the fifth wheel and cooperating with tooth bars 24, 25 extending along each of the rails 11, 12. The latches are biased by means of for example springs 26 to maintain a locking position and is adjustable to a releasing position by means of a manoeuvring device 27 which can be a purely mechanical device with a handle 28 or for example a fluid cylinder controlled by the driver in the driver's cabin or by a person nearby.

The fifth wheel 4 can principally be of a conventional type forming a support surface 29 cooperating with a surface of the trailer and has a rearward extending opening 30 and an inner recess 31 in which the king pin is received and is locked by means of a releaseable locking mechanism 32 closing the opening and the recess 31 and actuated by means of for example a handle 33, alternatively an electrical or fluid controlled actuator, controller in combination with a sensor signal which will be further described below. The fifth wheel 4 is pivotable relative to the carriage 13 within a limited angular interval by means of a pivot shaft 34 extending horizontally and transversally to the tractor truck. The pivotability provides for an adaption of the coupling arrangement to different positions of the trailer relative to the truck during driving coupling unloading.

The fifth wheel assembly 3 further includes a number of position sensors, for example a forward sensor 35 and a rear sensor 36 sensing the position of the carriage 9 and consequently the fifth wheel along the path namely relative to the fixed structure ie the rails 7,8. A further sensor 37 senses the presence of the king pin in its recess 25. The sensors are able to provide information of the positions and also to activate or lock means for different purposes provided certain conditions are fulfilled.

The sensors 35, 36, 37 form part of a control system, including a control unit which is able to receive information such as input signals from the sensors and other input information such as vehicle parameters, presence of the king pin in its locked position in the fifth wheel 4 etc. On the basis of the received information the control system can control predetermined parameters and allow or inhibit certain steps.

The above described structure provides for a method for operating the fifth wheel assembly according to the present invention. This operation includes positioning the fifth wheel 4 in two alternative operation modes, namely a normal operating mode, in which the fifth wheel is positioned in one or several positions, and a rear coupling mode, in which the fifth wheel is placed in one or several rear positions for coupling or disconnecting the trailer to or from the truck.

In the normal operating mode the vehicle computer receives information from the forward sensor 35 about the position of the fifth wheel 4 resulting in an output signal informing the driver and securing the locking mechanism 32 in its locking position for the king pin for preventing unintentional release of the trailer from the truck.

In the coupling/disconnecting mode the sensor 36 will for example provide for a control of one or several parameters, for example height, traveled distance, axle load and/or speed within a low speed interval, for example up to a maximum speed of the truck to a predetermined value, for example 30 kmph. Also the working environment for the driver will be improved when he will connect air and electricity to the trailer. By sensing that the position of the fifth wheel is in its rear position or positions the rear sensor 36 will also provide for a signal allowing the locking mechanism 32 for the king pin to open allowing that the trailer can de disconnected from the truck.

Figure 5:
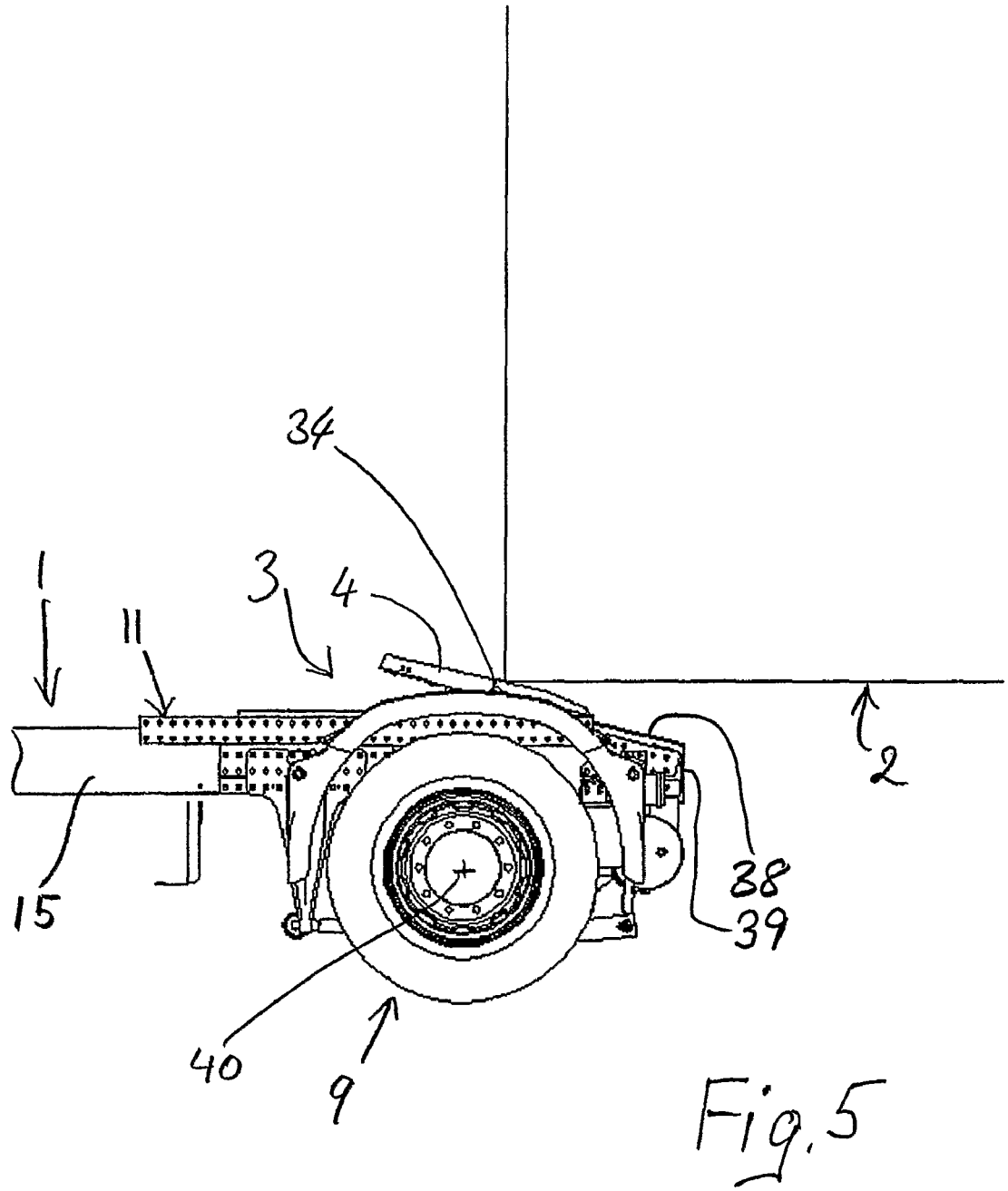
FIG. 5 is a side view corresponding to FIG. 2 but in a coupling/separating mode.

As indicated in FIG. 5 the fifth wheel 4 can be inclined to an inclined position and be positioned to form an extension of rear, inclined support surfaces 38 of the ends 39 of the main beams 7 which has been made possible by positioning the fifth wheel in its rear position or positions above the rear wheel assembly 9 or even behind the wheel axis 40. It is apparent that the rear position of the fifth wheel 4 will secure during coupling or disconnecting operation that there is no risk of interference between the trailer and equipment attached to the frame of the truck.

The present invention is not limited to the embodiment as described above but can be modified within the scope of the following claims. For example in the forward mode the fifth wheel can alternatively be positioned in one single driving position and alternatively in several rear positions in the coupling/disconnecting mode.

The invention claimed is:

1. A fifth wheel assembly for coupling a trailer to a truck tractor, the assembly comprising
   a fifth wheel and a supporting structure for supporting the fifth wheel on a rear part of the tractor truck, the supporting structure including a sliding arrangement enabling the fifth wheel to be repositioned between different positions, the fifth wheel being repositionable between one or more forward, normal operating positions corresponding to a normal operating mode and one or more rear coupling/disconnecting positions corresponding to a coupling/disconnecting mode, and
   a plurality of sensors positioned on the supporting structure and on the fifth wheel, the sensors being included in a control system for at least one of predetermined information and control of operating conditions, and
   wherein, in the coupling/disconnecting mode, the control system is operable to control the operating conditions in respect of at least one vehicle parameter including at least one of height, axle load, traveled distance, and maximum speed,
   wherein the plurality of sensors includes a forward sensor which is operable to sense and indicate a forward position of the fifth wheel in the control system which includes a control of a locking mechanism securing that a king pin is maintained in its locked position for coupling the trailer to the truck tractor, and the plurality of sensors includes a rear sensor provided to sense and indicate a rear position of the fifth wheel in the control system for enabling control of at least one of the vehicle parameters.

2. A method of operating a fifth wheel assembly for coupling a trailer to a truck tractor, the assembly comprising a fifth wheel and a supporting structure for supporting the fifth wheel on a rear part of the truck tractor, the supporting structure including a sliding arrangement enabling the fifth wheel to be repositioned between different positions, the method:
   repositioning the fifth wheel between at least one forward, normal operating position corresponding to a normal operating mode and at least one rear coupling/disconnecting position corresponding to a coupling/disconnecting mode;
   sensing the positions by means of a control system for predetermined information and/or control of operating conditions, and in the coupling/disconnecting mode the control system being operable to control the operating conditions in respect of at least one vehicle parameter including at least one of height, axle load, traveled distance, and maximum speed;
   using a forward sensor which is operable to sense and indicate a forward position of the fifth wheel in the control system which includes a control of a locking mechanism securing that a king pin is maintained in its locked position for coupling the trailer to the truck tractor; and
   using a rear sensor which is operable to sense and indicate a rear position of the fifth wheel in the control system for controlling at least one of the vehicle parameters.

* * * * *